United States Patent [19]

Arisaki

[11] Patent Number: 4,461,629
[45] Date of Patent: Jul. 24, 1984

[54] HEAT RECOVERY PROCESS IN COAL GASIFICATION

[75] Inventor: Kenji Arisaki, Kure, Japan

[73] Assignee: Babcock-Hitachi, Ltd., Tokyo, Japan

[21] Appl. No.: 427,689

[22] Filed: Sep. 29, 1982

Related U.S. Application Data

[62] Division of Ser. No. 228,775, Jan. 27, 1981, abandoned.

[30] Foreign Application Priority Data

| Jan. 29, 1980 | [JP] | Japan | 55-8296 |
| Jan. 29, 1980 | [JP] | Japan | 55-8297 |
| Jan. 29, 1980 | [JP] | Japan | 55-8298 |
| Jan. 29, 1980 | [JP] | Japan | 55-8299 |
| Jan. 29, 1980 | [JP] | Japan | 55-8300 |

[51] Int. Cl.³ .............................................. C10J 3/84
[52] U.S. Cl. ...................................... 48/210; 48/202;
55/76; 55/79; 55/80; 55/85; 55/89; 55/99;
122/7 R
[58] Field of Search ...................... 48/202, 206, 210;
55/80, 96, 97, 99, 75–77, 85, 89, 269, 79, 315;
165/104.16, 158; 122/5, 7 R

[56] References Cited

U.S. PATENT DOCUMENTS

| 4,033,117 | 7/1971 | Smith ........................................ 55/99 |
| 4,149,858 | 4/1979 | Noack et al. ........................... 55/79 |
| 4,198,212 | 4/1980 | Tsao ........................................ 48/210 |
| 4,233,275 | 11/1980 | Kimura et al. ........................ 48/210 |
| 4,307,773 | 12/1981 | Smith ................................ 165/104.16 |

Primary Examiner—Peter F. Kratz
Attorney, Agent, or Firm—Beall Law Offices

[57] ABSTRACT

An overall process of cooling, dust removal, tar removal and heat recovery of high temperature gas generated in coal gasification furnaces, and apparatuses employed therefor are provided. In this process, specific apparatuses such as fluidized bed-cooler, fluidized bed-combustion furnace for regenerating granules, granular bed filter, gas cooler, and tar scrubber are successively and effectively employed. During the process, high, medium and low pressure steam, for example, are recovered by heat exchange in these apparatuses.

15 Claims, 10 Drawing Figures

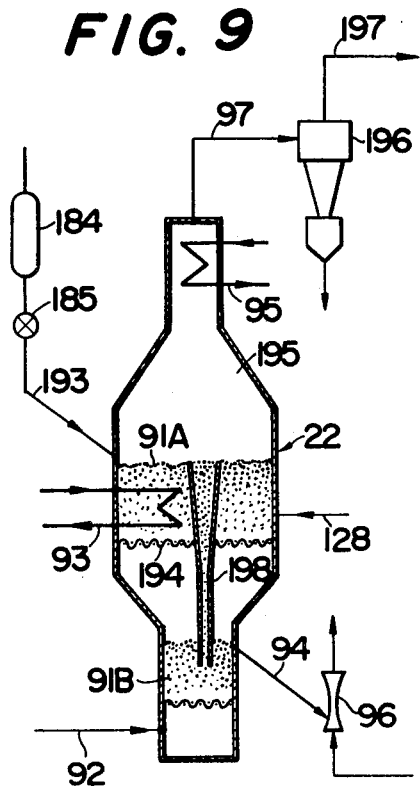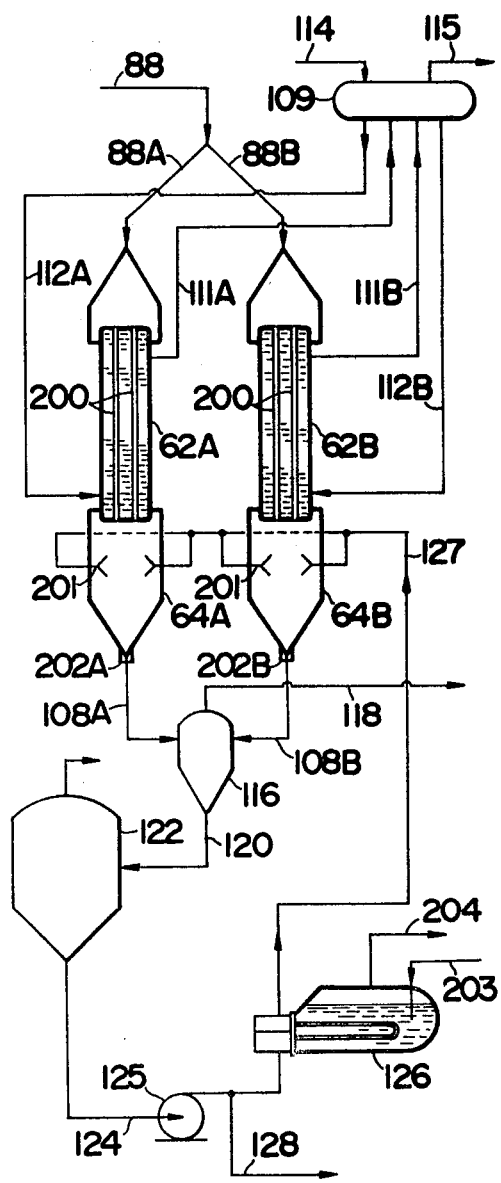

HEAT RECOVERY PROCESS IN COAL GASIFICATION

This is a division of application Ser. No. 228,775, filed Jan. 27, 1981, now abandoned.

BACKGROUND OF THE INVENTION

1. Field of the Invention

This invention relates to an overall process of cooling, dust removal, tar removal and waste heat recovery of high temperature gas generated in coal gasification furnaces, and also to apparatuses employed in the above process.

2. Description of the Prior Art

According to one of processes for coal gasification, coal is gasified by reacting it with hydrogen, steam or the like at high temperatures and high pressures. Such gases generated from coal gasification furnaces have high temperatures of 800° to 1000° C. and contain dust such as undecomposed coal, ash, etc., byproduced tar, pitch, oil mist, etc.; hence in order to effectively utilize such gases, gas cooling, dust removal and tar removal are necessary, and at the time of cooling, it is also necessary to recover the waste heat by effective means.

The gas cooling has heretofore included two manners: usual tubular heat exchange and direct spouting of cooling medium. However, the tubular heat exchange employing shell-and-tube heat exchangers has drawbacks in that the tar contained in the cooled gas adheres onto the surface of heat transfer tubes, etc. and solidifies there to inhibit not only the heat transfer performance of the tubes, but also the gas flow function thereof. On the other hand, the latter cooling manner of directly spouting a lower temperature oil or the like into the gas is also uneconomical, since the sensible heat of the gas is scattered wastefully.

SUMMARY OF THE INVENTION

An object of this invention is to provide a process for removing dust from the high temperature gas generated from the plants for coal gasification and also cooling the gas without any adhesion and solidification of tar and the like.

Another object of this invention is to provide a process for effectively recovering the sensible heat of the high temperature gas and also fully recovering the heat generated from the additional treatment of the gas in the coal gasification process.

A further object of this invention is to provide apparatuses suitably employed for dust removal from, cooling of and heat recovery from the high temperature gas.

A still further object of this invention is to provide a heat-exchange means capable of establishing such a safe temperature that tar contained in the gas does not solidify even when it is condensed; a heat-exchange means having a structure capable of discharging the condensed tar by flow-down and maintaining the surface of heat transfer tubes in its normal state; and further a cooler capable of improving the gas cooling efficiency and also removing dust from the gas by direct contact of oil with the gas and cooling of the gas thereby.

According to the present invention, a process is provided which mainly comprises passing the gas generated in coal gasification furnaces through a fluidized bed-cooler provided therein with heat transfer tubes having cooling medium such as water passed therethrough, to thereby cool the generated gas and recover the heat of the gas in the form of hot water or steam, for example, and at the same time remove unnecessary substances contained in the gas through adhesion thereof onto the fluidizing medium constituting the fluidized bed.

In the above process, it is preferable to exchange heat between char discharged from the coal gasification furnaces and cooling medium to recover the heat of the char in the form of hot water or steam, for example, and combine this hot water or steam with that obtained in the above fluidized bed-cooler.

As the fluidized bed-cooler employed in the present invention, an apparatus is preferable which comprises a body consisting of a vertical-type vessel; a downcomer through which cooling medium is passed, passing through the axially central part of the fluidized bed of a fluidizing medium to be formed inside the body; a manifold provided at the lower end part of the downcomer; a group of heat transfer tubes extending radially from the manifold and then extending upwards in parallel to the flow of gas to be sent from the lower part of the body; and a header connected to the upper ends of the heat transfer tubes.

In the above process of the present invention, the fluidizing medium contained in the fluidized bed-cooler, onto which unnecessary substances contained in the gas have adhered are preferably treated such that the fluidizing medium is withdrawn from the fluidized bed-cooler and subjected to combustion treatment in a fluidized bed-combustion furnace to regenerate the fluidizing medium, and at the same time the heat generated by the combustion treatment is recovered by heat exchange with cooling medium contained in heat transfer tubes provided in the fluidized bed-combustion furnace.

Further, according to the present invention, an overall process for cooling, dust removal from the heat recovery from the gas generated in coal gasification furnaces is provided which comprises; a step of introducing the gas into a granular bed means such as a fluidized bed cooler and/or a moving bed filter, cooling the gas by cooling medium passed through heat transfer tubes provided inside said granular means and at the same time recovering heat from the generated gas by heat exchange with the cooling medium; and a step of passing the gas cooled in said granular bed means, successively through a gas cooler and a scrubber, to cool the gas and remove dust and tarmist therefrom, and through the cooling and scrubbing of the gas in said gas cooler and said scrubber, recovering waste heat from the gas.

As the cooling medium, materials having gas-liquid phase change at an appropriate temperature, such as water, alcohols, and other organic and inorganic ones can be employed.

In the case of employing water as the cooling medium, a typical process according to the present invention comprises the following steps; a step of introducing the generated gas into a fluidized bed-cooler, cooling the gas by cooling water passed through heat transfer tubes provided inside the fluidized bed-cooler and at the same time recovering the heat of the generated gas in the form of high pressure steam; and a step of passing the gas cooled in the fluidized bed-cooler, successively through a granular bed filter, a gas cooler and a scrubber wherein oil, preferably a recovered tar is sprayed to cool the gas and remove dust and tar mist therefrom, and during the cooling of the gas in said gas cooler and said scrubber, generating medium pressure steam in the gas cooler and low pressure steam in the scrubber, respectively, for waste heat to be recovered.

As the granular bed filter employed in the above process, an apparatus is preferable which comprises a body consisting of a vertical type vessel; a gas-introducing passage provided at the axially central part of the body; a plurality of louver-form walls provided so as to concentrically surround the gas-introducing passage; a means for forming moving beds by feeding medium of granules in the respective ring-form spaces between these louver-form walls; and nozzles for discharging the gas having passed through the louver-form walls and the moving beds of granules to the outside of the body, the respective upper ends of the louver-form walls being fixed onto the body by a granule-feeding duct, the respective lower ends of the louver-form walls being connected to a granule-discharging duct, and the respective granule-discharging duct being slidably contacted with the opening part of the body at the end part thereof so as to allow these granule-discharging ducts to expand thermally.

The regenerated granules obtained by feeding granules having substances adhered thereonto to a regeneration furnace consisting of a fluidized bed-combustion furnace and subjecting the granules to combustion treatment therein, are preferably recirculated to the granular bed filter and/or the above-mentioned granular bed-cooler.

As such a fluidized bed-combustion furnace, an apparatus is preferably employed which comprises a body of a vertical type vessel, upper and lower stage fluidized beds contained therein, which are connected through a vertical overflow pipe. In the upper stage fluidized bed, combustible substances adhering to the granules are burnt, and in the lower stage fluidized bed, air to be fed to the upper stage fluidized bed is preheated and at the same time the regenerated granules flowing down through the overflow pipe are cooled.

For cooling the gas having left the granular bed filter and also removing tar mist therefrom, the above-mentioned gas cooler is preferably of a vertical type wherein a plurality of heat transfer tubes through which cooling water is passed are vertically arranged. The above-mentioned scrubber is preferably a vessel wherein the lower ends of the above-mentioned heat transfer tubes are opened and nozzles for spraying recovered tar into the vessel are provided. The gas cooled by passing through the heat transfer tubes is introduced directly into the scrubber where the gas is contacted with recovered tar, and tar mist in the gas is removed. It is preferable to maintain the wall temperature of the heat transfer tubes at 200° C. or higher to avoid adhesion and solidification of tar.

The above-mentioned gas cooler is connected to a condensation drum through a riser and a downcomer, and the heat of the gas passing through the heat transfer tubes inside the gas cooler is recovered in the form of such medium pressure steam as 15 kg/cm$^2$G, through the condensation drum and heat transfer tubes inside the drum.

Further, the scrubber is further connected to a gas-liquid separator such as cyclone and is provided with a means for recirculating the tar condensed in the gas-liquid seaprator to the scrubber and also a heat exchange means for recovering the heat of the recovered tar in the form of low pressure steam of 3 kg/cm$^2$G.

BRIEF DESCRIPTION OF THE DRAWING

FIG. 9 shows a cross-sectional view of the fluidized bed-combustion furnace for regenerating the medium granules from the granular bed filter.

FIG. 10 shows a flow diagram illustrating a gas cooler and a scrubber for further cooling the gas discharged from the granular bed filter and removing tar mist therefrom,

DESCRIPTION OF THE PREFERRED EMBODIMENTS

Figure 1:
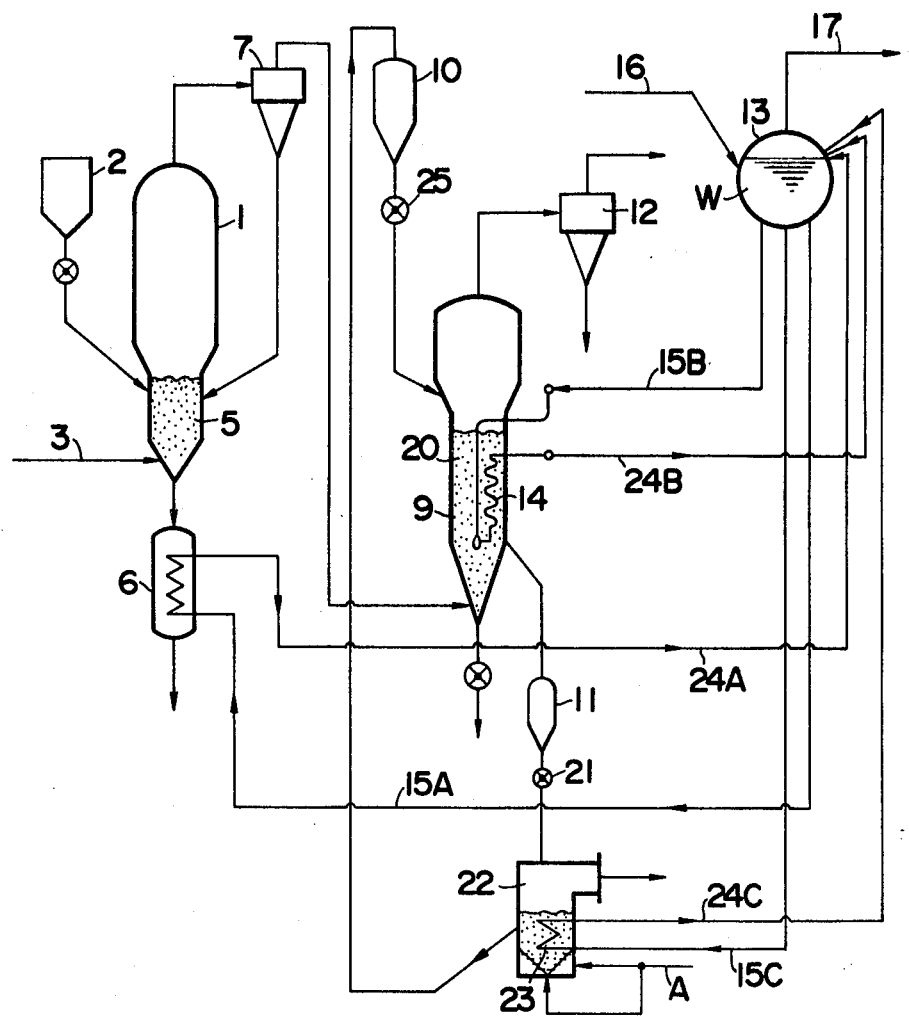
FIG. 1 shows a flow diagram illustrating a process of cooling, dust removal, tar removal and heat recovery of the gas generated in coal gasification furnaces, in which process a fluidized bed-cooler is employed.

An embodiment of a process for cooling, dust removal, tar removal and waste-heat recovery of coal gas, employing a fluidized bed-cooler is illustrated in FIG. 1.

Coal inside a hopper 2 is fed to a reaction zone 5 inside a coal gasification furnace 1 where a gasification reaction is carried out at a high temperature and a high pressure together with a gasifying agent 3 such as hydrogen, steam (H$_2$O), etc. introduced therein. The gas generated by this reaction is led from the top of the furnace 1 into a dust collector 7 such as cyclone where dust contained in the gas is removed, and the collected dust is returned to the furnace 1. Residual char (abbreviated hereinafter to "Char") formed by the gasification reaction is discharged from the lower part of the furnace and flows into a char cooler 6 where heat exchange is carried out between the char and cooling water W fed through a piping 15A from a drum 13 to recover the heat of the char while the char being cooled. On the other hand, the reaction gas having left the dust collector 7 is led into a fluidized bed-cooler 9 wherein heat transfer tubes 14 are provided and a fluidizing medium such as sand is fluidized by introducing the reaction gas to form a fluidized bed 20. Cooling water W is flown from the drum 13 via a piping 15B into the heat transfer tube 14 inside the fluidized bed 20 to effect heat exchange between the cooling water and the reaction gas, resulting in the gas being cooled. At that time, tar, pitch, oil mist, etc. contained in the reaction gas adhere onto the surface of the fluidizing medium constituting the fluidized bed, which results in removal of unnecessary components contained in the reaction gas. After completion of the cooling and the removal of unnecessary components, the reaction gas enters a dust collector 12 where dust is removed, and then discharged to the outside of the system. On the other hand, a part of the fluidizing medium inside the fluidized bed-cooler 9, having unnecessary components adhered thereonto, is extracted at the lower part of the cooler to the outside and led into a hopper 11 for the extracted medium. The medium inside the hopper 11 is fed through a metering feeder 21 such as rotary feeder into a regeneration furnace 22 wherein organic components such as tar adhering to the medium are burnt. This regeneration furnace 22 is a fluidized bed furnace wherein a fluidized bed is formed by the medium extracted from the cooler 9 and fluidizing air A, and the components adhering onto the surface of the fluidizing medium are burnt. At that time, as in the cases of the char cooler 6 and the cooler 9, cooling water W inside the drum 13 is fed via a piping 15C into a heat transfer tube 23 inside the fluidized bed for heat recovery. After completion of the regeneration by burning, the fluidizing medium is transferred to a hopper 10 for the fluidizing medium and then fed via a valve 25 into the fluidized bed-cooler 9.

In the above-mentioned process, the respective portions of cooling water W, after having effected heat exchange in the char cooler 6, the fluidized bed-cooler 9 and the regeneration furnace 22, are returned via piping 24A, 24B and 24C to the drum 13, in the form of hot water or steam, and a portion of the steam is then discharged via a piping 17 to the outside of the system for utilization. Numeral 16 shows a pipe for feeding water W to the drum 13.

Figure 2:
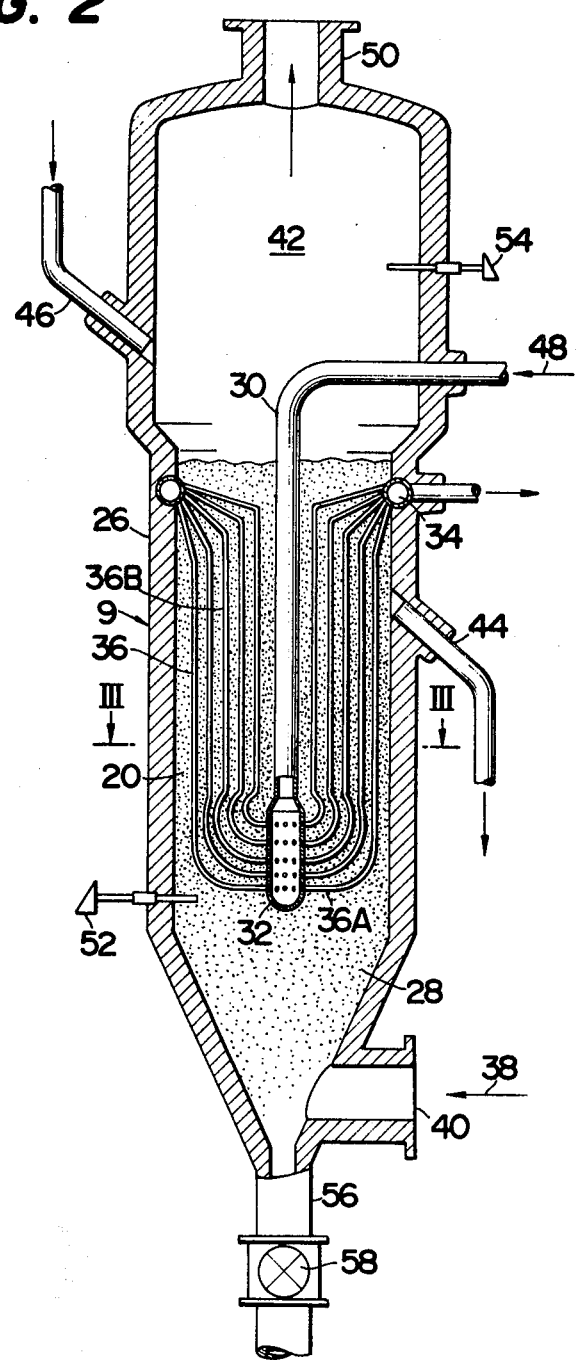
FIG. 2 shows a cross-sectional view of an embodiment of the fluidized bed-cooler employed in the present invention.
Figure 3:
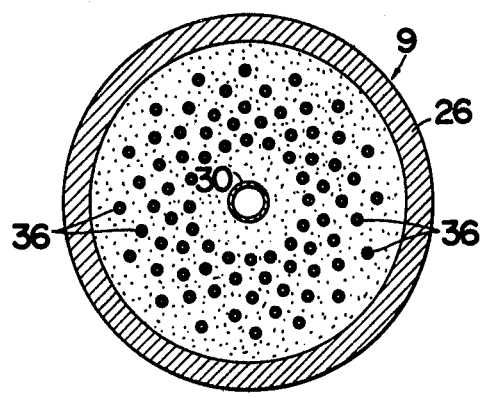
FIG. 3 shows a cross-sectional view of the fluidized bed-cooler cut along III—III line of FIG. 2 in the direction of arrow marks.

A representative embodiment of the fluidized bed-cooler 9 employed in the above-mentioned process is shown in FIG. 2 and FIG. 3.

In FIG. 2, the body of the fluidized bed-cooler 26 is vertically cylindrical and its lower part constitutes a conical spouting part 28, a fluidizing medium being filled inside this spouting part 28 and a cylindrical part connected thereto. Further, inside the body of the cooler 26 is provided a downcomer 30 extending downwards through the central part of the fluidized bed toward the spouting part 28, the lower end of which downcomer 30 constitutes a manifold 32. Between this manifold 32 and a ring-form header 34 provided on the inner wall of the body of the cooler at the upper part of the fluidized bed, are placed a plurality of heat transfer tubes 36 which are each radially extended out from the manifold 32 toward the inner wall of the body of the cooling apparatus 26, then bent upwards by about 90° to the radially extended part 36A and constitute a main heat transfer part 36B arranged in parallel to the direction of the reaction gas flow, and finally connected to the header 34 arranged in ring form relative to the inner wall of the body.

Reaction gas 38 at a high temperature flows into the body 26 through a nozzle 40 provided at the spouting part 28, and fluidizes the fluidizing medium during its ascending inside the body 26, to form a fluidized bed 20. The high temperature gas 38 transfers its heat to the fluidizing medium and heat transfer tubes and is cooled during its passage through the fluidized bed 20, while the components contained in the reaction gas, i.e. tar, pitch, oil mist, etc. adhere to the fluidizing medium and are removed from the gas. Next, the fluidizing medium having a temperature elevated by the heat exchange between the medium and the reaction gas and having the components adhered thereto, is withdrawn from the body through a nozzle 44, while a fresh fluidizing medium is fed through a nozzle 46 to thereby keep the height of the fluidized bed at a definite one.

On the other hand, the heat transfer medium 48 (cooling medium) such as water passes through the downcomer 30 which descends through the central part of the fluidized bed 20 toward the spouting part 28, to the manifold 32 as a distributor, where the medium reverses its direction and ascends through heat transfer tubes 36. Thus, the heat transfer medium 48 inside the heat transfer tubes effects heat exchange between the medium and the reaction gas to cool the gas, while the medium itself is heated and discharged to the outside of the system in the form of hot water or steam (in the case where the heat transfer medium is water). After completion of the heat exchange, the reaction gas is led through the fluidized bed 20 to an empty column part 42. Since this empty column part 42 has a larger cross-sectional area than that of the cylindrical part located therebelow, the gas flow rate is reduced to cause the fluidizing medium whirled up by the gas flow to fall down, while the gas is discharged from an exit nozzle 50.

In the above-mentioned cooling process, the inside temperature of the fluidized bed is detected by a temperature of the empty column part, by a temperature detector 54, to adjust the amounts of the fluidizing medium fed and discharged and the amount of the heat transfer medium introduced, and also control the extent to which the reaction gas is cooled. In addition, numeral 56 shows a nozzle employed for discharging a large amount of the fluidizing medium. Numeral 58 shows a rotary valve.

Since the heat transfer pipes arranged inside the fluidized bed are located in parallel to the flow direction of the reaction gas, the fluidized bed-cooler 9 does not hinder the fluidization of the fluidizing medium; hence it is possible to effectively carry out the cooling of the reaction gas and the heat recovery therefrom.

Figure 4:
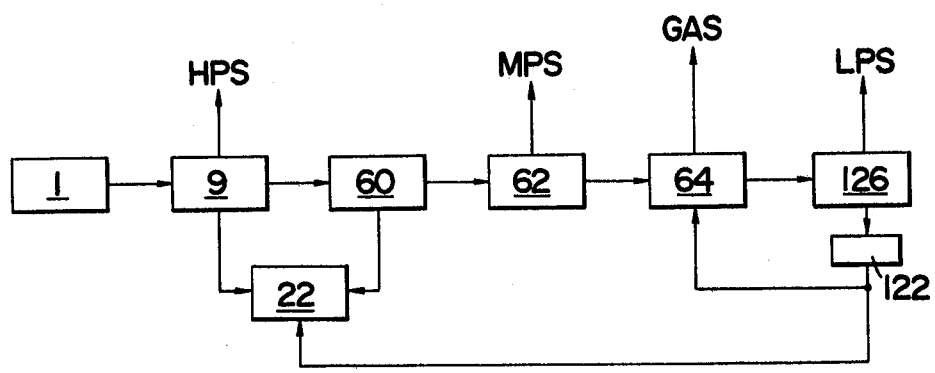
FIG. 4 shows a block diagram illustrating a preferable embodiment of an overall process according to the present invention, for cooling, dust removal, tar removal, and heat recovery of the gas generated in coal gasification furnaces.
Figure 5:
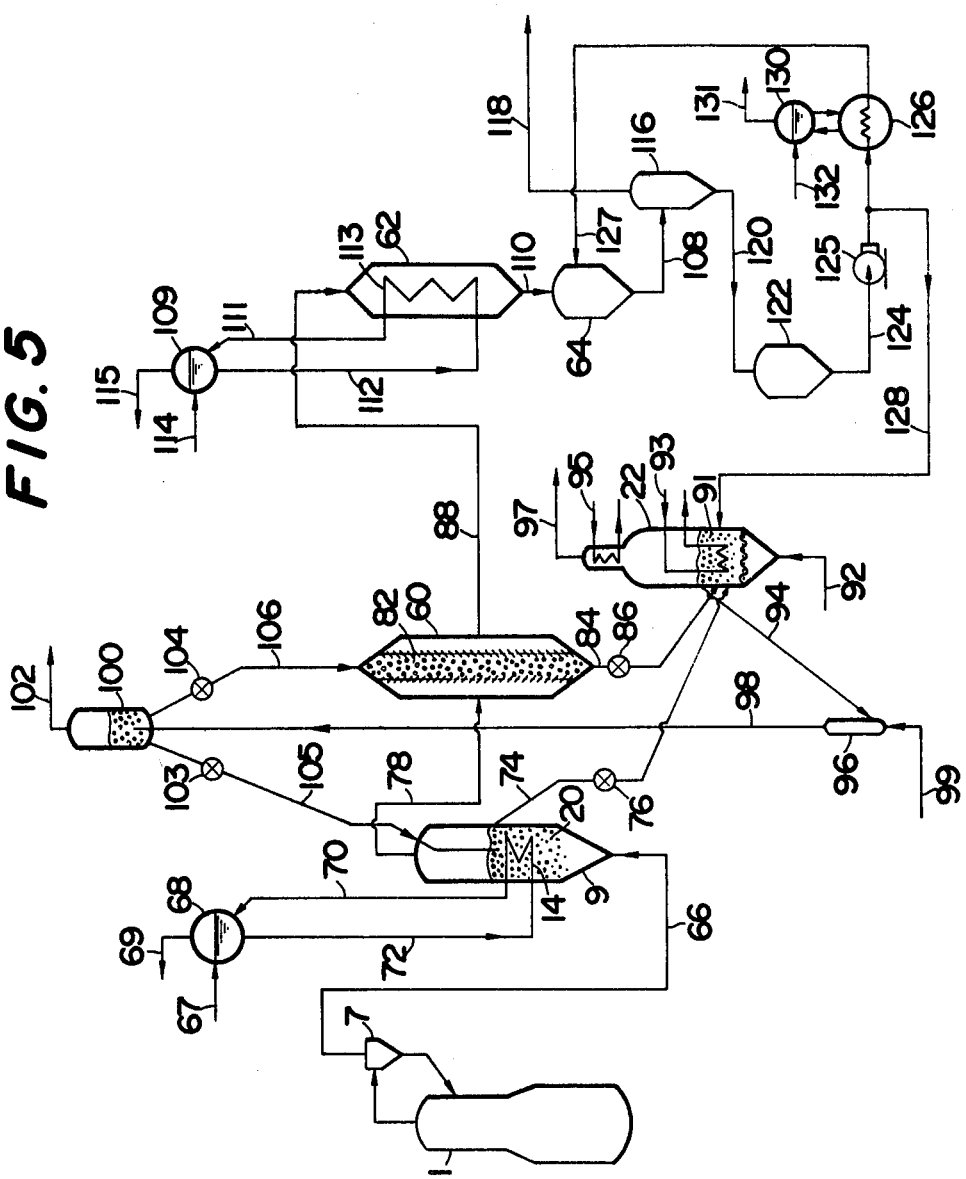
FIG. 5 shows a flow diagram including a combination of concrete apparatuses to be employed in the overall process shown in FIG. 4.

Next, a block diagram of the overall process for carrying out cooling, dust removal, tar removal and heat recovery of the gas generated in coal gasification furnaces is shown in FIG. 4, and a concrete embodiment therefor is shown in FIG. 5.

In this overall process, as is shown in FIG. 4, the gas generated in the coal gasification furnace 1 is passed through a fluidized bed-cooler 9, a granular bed filter 60, a gas cooler 62 and a scrubber 64 to carry out dust removal and gas cooling, while three kinds of high pressure steam (HPS), medium pressure steam (MPS) and low pressure steam (LPS) are generated to effect waste heat recovery.

The gas generated in the coal gasification furnace 1 contains e.g. several grams of dust per $Nm^3$, and also tar in an amount of at the most about 3%, based on the amount of coal treated is byproduced and present in the form of mist in the high temperature gas. In FIG. 5, the coal gas is first subjected to rough removal of dust in a cyclone 7 and then sent through a duct 66 to the fluidized bed-cooler 9 in the form of a gas of a high dust content such as several grams per $Nm^3$. The fluidized bed-cooler 9 is constituted by a heat transfer tube 14 provided inside the fluidized bed 20 in the body of the cooler, a boiler drum 68, a riser 70 and a downcomer 72, and granules as the fluidizing medium such as alumina granules of 1 to 2 mm in diameter are fluidized by the above-mentioned gas inside the body of the cooler to form a fluidized bed 20. The sensible heat of the gas is transferred by the medium of the granules to the heat transfer tube 14 to generate steam. The gas is cooled down to a temperature level e.g. 400° to 500° C. at which the fluidization is maintained, in the cooler 9, without any sticking of the granules with each other and any solidification thereof in the fluidized bed. Thus, the pressure of the steam to be recovered, inside the heat transfer tube 14 is also sufficiently elevated up to a pressure corresponding to the above temperature, e.g. 60 to 100 kg/cm$^2$G, whereby the temperature of the heat transfer surface is maintained. By maintaining the temperature of the heat transfer surface at 400° to 500° C. as described above, it is possible to clean the dirty heat transfer surface through the contacting and self-cleaning action of the granules. In addition, numerals 67 and 69 show a water-feeding pipe to and a steam-discharging pipe from the boiler drum 68, respectively.

Since a small amount of tar adheres onto the surface of the granules inside the fluidized bed-cooler 9, the granules are quantitatively withdrawn through an overflow pipe 74, and further sent via a rotary valve 76 to a regeneration furnace 22, where the granules are subjected to regeneration treatment. On the other hand, the gas having left the fluidized bed-cooler 9 is sent via a duct 78 to a granular bed filter 60 wherein granules of e.g. alumina 82 similar to those employed in the cooler 9 are filled. The granules are quantitatively withdrawn through a pipe 84 and a rotary valve 86 while forming a moving bed in the filter 60. The dust-containing gas leaves the dust in the granular bed when it is passed through the bed, and the resulting cleaned gas is discharged through a duct 88. For the dust removal at high temperatures, the granular bed is most suitable, since conventional mechanical dust-collectors such as cyclone have a drawback in that adhesion of dust onto the wall of the collectors, occurs and causes clogging etc., while electric precipitators have a temperature limitation beside the dust adhesion. In addition, although it is functionally possible to remove dust from the gas having a high temperature close to 1000° C. at the exit of the coal gasification furnace, by means of the granular bed, it encounters a structural difficulty to make the mechanical elements for withdrawing and feeding the granules, resistant to such a high temperature. Thus, when a fluidized bed-cooler as a means for cooling the high temperature gas containing dust and tar is used while recovering heat from the gas, a combination of such a fluidized bed-cooler with the granular bed is very effective.

As to the granules 82 in the granular bed, those of the same specification as in the fluidized bed-cooler may be conveniently employed. The granules withdrawn from the granular bed 60 are then treated in the regeneration furnace 22 which is a fluidized bed-combustion furnace and in which the granules are fluidized by combustion air 92 and dust and substances adhering onto the surface of the granules are subjected to combustion treatment by the aid of a combustion-aiding oil. Numeral 91 shows the granular fluidized bed. Numeral 93 and 95 each show a heat transfer tube provided inside the fluidized bed and at the top of the column, respectively. Numeral 97 shows a gas-discharging pipe.

The granules thus regenerated are withdrawn from the regeneration furnace 22 through an overflow pipe 94, and then transferred by compressed air fed through a pipeline 99, by means of a blowing-up means 96 through a pipe 98 to a hopper 100. The compressed air is separated from the granules and exhausted from a pipeline 102. The regenerated granules are fed through rotary valves 103 and 104, feed pipes 105 and 106 again to the fluidized bed-cooler 9 and the granular bed 60.

The gas free of dust is further cooled by the cooler 62 and led through a short pipe 110 to the scrubber 64. The cooler 62 has a heat transfer pipe 113 through which cooling water is passed, which is connected to a boiler drum 109 via a riser pipe 111 and a downcomer 112. Feed water 114 to the boiler drum 109 is introduced into the drum 109, vaporized and withdrawn therefrom in the form of medium pressure steam 115. The tar contained in the gas has a limitation to fluidity in the vicinity of 150° C.; hence unless the inside of the cooler 62 is maintained above the temperature of 150° C., adhesion and solidification of tar occur. Thus, heat recovery in the cooler 62 is made so as to give steam whose saturation temperature corresponds to 200° to 250° C. As one of examples designed, a medium pressure steam of 15 kg/cm$^2$G at a gas temperature after cooling, of 250° C. and a wall temperature of the heat transfer tube above 200° C. may be employed.

In the scrubber 64, recovered tar is spouted directly into the scrubber to further cool the gas and at the same time remove the tar contained in the gas.

Even if the bed of the granular bed filter 60 is provided in a plurality of stages, the efficiency of dust removal has a limitation, but in the case where the scrubber 64 is further provided as mentioned above, a sufficient dust removal can be effected.

The gas having left the scrubber 64 is sent through a duct 108 to a gas-liquid separator such as cyclone 116 where gas-liquid separation is carried out, and then sent through a pipeline 118 to the outside of the system, while recovered tar is sent through a piping 120 to a tar pot 122.

The tar temperature in the tar pot 122 is in the vicinity of 200° C. that is the same temperature as that of a separated gas 118; hence the tar is further cooled in a waste heat boiler 126 in order to elevate the cooling performance of the tar in the scrubber 64. Namely, there is formed a circulation line of recovered tar consisting of an exit piping 124 from the tar pot 122, a pump 125, a boiler 126 and a piping 127, to carry out cooling of the tar and at the same time heat recovery. Excess tar is discharged through a piping 128 and utilized as the combustion-aiding oil for the regeneration furnace 22. As a design example of the boiler 126, a boiler inlet temperature of 250° C. and an exit temperature of 150° C. are illustrated, and steam 131 generated in a drum 130 is of a low pressure of about 3 kg/cm$^2$ G. Numeral 132 shows feed water to the drum 130. In addition, if the waste heat boiler 126 is replaced by a water cooler, the heat transfer pipe is ruled by water temperature; hence the tar temperature becomes lower, resulting in tar solidification. Thus, it is most preferable to employ a low pressure boiler here.

Figure 6:
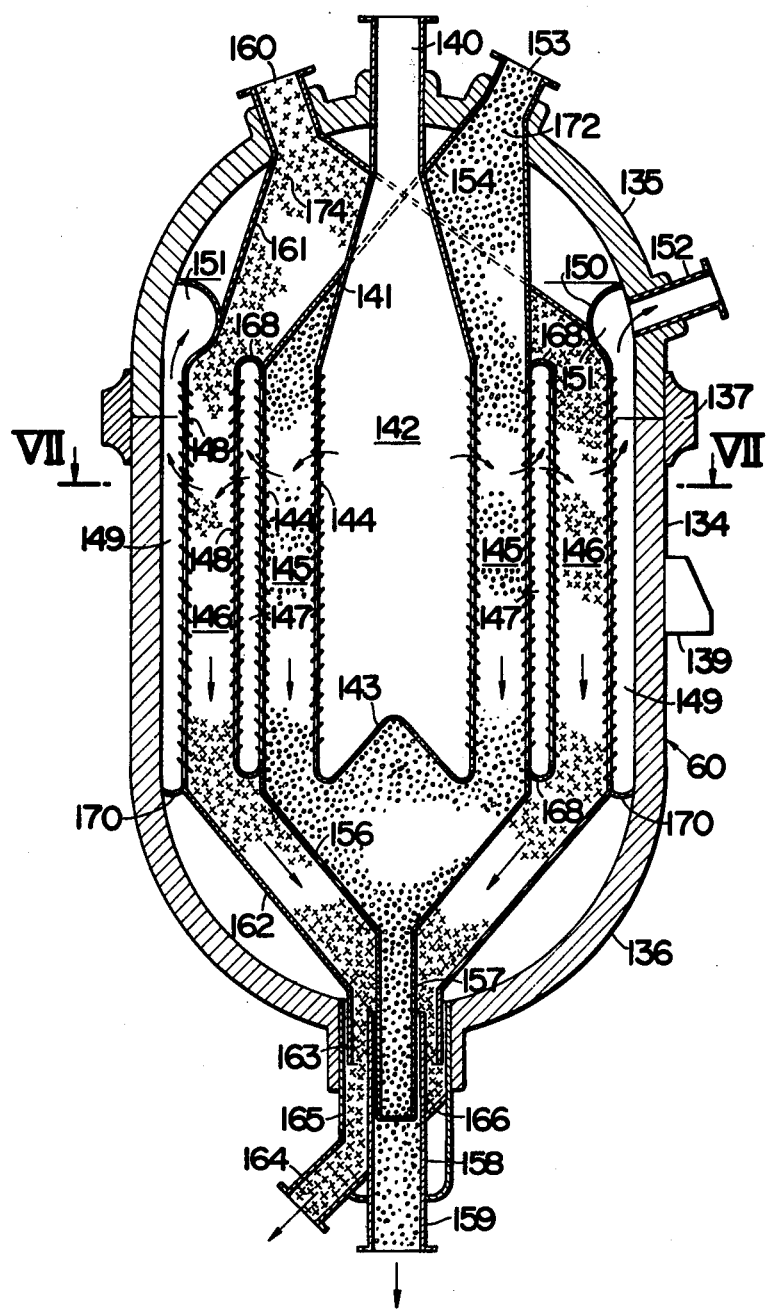
FIG. 6 shows a cross-sectional view of the granular bed filter shown in FIG. 5.
Figure 7:
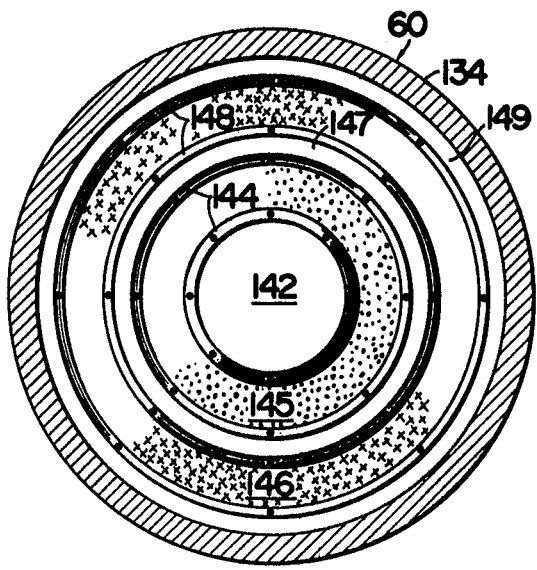
FIG. 7 shows a cross-sectional view of the granular bed filter cut along VII—VII line of FIG. 6 in the direction of arrow marks.

A preferable embodiment of the granular bed filter 60 shown in FIG. 5 is illustrated in FIG. 6. FIG. 7 shows a cross-sectional view of the filter cut along the line VII—VII of FIG. 6 in the arrow direction.

In general, such a dust-removing means of the granular bed type is effective for treating gases at high temperatures and high pressures. According to such a means, when a dust-containing gas is passed through a moving bed of slowly moving granules (abbreviated hereinafter to "bed"), the dust is caught by the granules, separated from the gas, and withdrawn from the bed along with the granules. Although there is the so-called kiesbed means employing fine particles such as sand, the granular bed means generally refers to the one employing granulated, calcined granules of e.g. alumina having a granular diameter of 1 to 2 mm. As to the efficiency of dust removal, for example in case where the dust removal is applied to a process for low calory gasification of coal by a partial oxidation with air, experimental results show that when the thickness of the bed through which the gas passes is in the range of 300 to 600 mm, the efficiency of dust removal at one stage (one layer) is in the vicinity of 90%, whatever moving rate of alumina granules may be employed. Thus, in order to sufficiently elevate the efficiency of dust removal up to 95% or higher, it is required to employ a plurality of stages as the bed. Further, the granules should be moved at a definite rate by metering charge and discharge between partition walls. In the case of high temperature gas, a countermeasure to absorption of the thermal expansion of members constituting these partition walls is required, and moreover, it is also required to pay attention so that the gas may not be shorted.

The granular bed filter shown in FIG. 6 is constructed as follows: at the axially central part of a vessel is located a gas-introducing passage around which a plurality of layers of louver-form walls are provided, and a large number of granules such as small spherical materials are fed in the spaces formed between the respective walls to form moving beds to thereby enable the gas to pass through the surfaces of the walls and the moving beds; one or more nozzles for discharging the gas are provided through the wall of the vessel; and the lower end parts of the louver-form walls are constructed so as to give an easily heat-expansible, thermal sleeve structure, without constraining each other.

The body of the bed 134 is a heat-resistant, pressure vessel having a top part end-plate 135 and a bottom part end-plate 136 connected by a body flange 137, its inner surface being lined by a heat insulation material. The body 134 has support-lugs 139 fixed thereto and vertically arranged on a pedestal. The dust-containing gas enters the body 134 through an upper part nozzle 140, passes through a cone duct 141 wherein the flow rate of the gas is reduced, and enters a cylindrical gas chamber 142 located at the central part of the vessel. The lower part of the gas chamber 142 is partitioned by a plate 143. Thus, the gas is led through a first stage louver 144 on the lateral side of the chamber, into a ring-form first stage bed 145 concentric with the gas chamber. The partitioning plate 143 is shaped into a mountain form protruded upward as shown in FIG. 6. This aims at preventing tar, oily materials, etc. from deposition and permitting the gas to be uniformly distributed in the louver at the lower part of the vessel.

Adjacently to the first stage bed, a ring-form intermediate gas chamber 147 and then a ring-form second stage bed 146 are located concentrically with the first stage bed. The gas is led from the gas chamber 142 located at the central part, through the louver 144 and then the first stage bed 145 into the intermediate gas chamber 147, and further through a louver 148 and then the second stage bed 146, and gathered in an outer peripheral space 149. The concentric conditions of the above-mentioned first stage bed 145, intermediate gas chamber 147, second stage bed 146 and outer peripheral space 149 will be more easily understood by referring to FIG. 7. In short, while the gas is passed through the first stage bed 145, the intermediate gas chamber 147 and the second stage bed 146, radially from the central part of the body of the vessel 134 toward its outer periphery, dust is caught between the granules contained in the two beds 145 and 146 to give dust-free gas, which is then passed through an outer peripheral gas chamber 149; gathered in a gas passage 151 formed by a partitioning plate 150 inside the top part end-plate; and discharged through one or more discharge nozzles 152. The granules in the first stage bed 145 are fed in metering manner through a nozzle 153, fall through a cone 154 and enter a space formed between the louvers 144, in which the first stage bed is formed.

The bed 145 placed between the concentric, ring-form louvers 144 has a bed thickness of e.g. 500 to 600 mm in which the granules are filled, and the end part of the outer louver 144 is connected to a downcomer 157 through a cone 156, which downcomer 157 is fit in a sleeve 158 connected to an exit nozzle 159, in a loose contact manner, to form the so-called thermal sleeve. The taper angle of the cone 156 is made sufficiently smaller than the angle of repose of the granules so that the granules may fall easily. By constructing the first stage bed 145 as described above, it is possible to easily pass the gas through the bed 145 and also to permit the granules to fall smoothly without their springing out of the bed.

The second stage bed 146 is similar to the first one in the construction except that the second stage is larger in the diameter and concentrically inserted outside the first one. Namely, the second stage bed 146 consists of a bed of the granules placed between cylindrical louvers 148, the upper part of the outer louver being connected to an inlet nozzle 160 through a cone 161, and the lower part thereof being connected to a sleeve 163 through a cone 162. The sleeve 163 is loosely contacted with a lower opening part of the body 134 with a certain allowance, and a nozzle 164 is fixed to this lower opening part through a sleeve 165. In addition, a guide plate 166 is provided so that the granules may be easily discharged from the nozzle 164. Further, for the gas seal of the space part 147 between the beds 145 and 146, partitioning plates 168 are provided at the upper and lower parts of the space part, respectively, and also for the gas seal of the outer side space 149, a partitioning plate 170 is provided. In addition, the upper part of the outer side space 149 constitutes a gas passage 151 as mentioned above. Since the thickness of the beds makes the resistance to the gas flow, a higher resistance to the gas flow than those brought about by the thickness of the beds is provided at any other opening parts, whereby there is no fear of the short-circuit of the gas, e.g. a gas leak from the bed 145 to the exit nozzle 159, a gas leak from the bed 146 to the nozzle 164, etc.

All of the above-mentioned structures constructed inside the body of the vessel 134 are fixed to the upper end-plate 135. Namely, the structures inside the body 134 are constructed in suspended manner, and inside the lower end-plate 136, the nozzle sleeves 158 and 157 are slidably connected with each other and the sleeves 165 and 163 are also slidably connected, whereby it is possible to absorb the thermal expansion.

The granules to constitute the second stage bed are fed through a nozzle 160, descend inside a cone 161 and form a moving bed in a space placed between the louvers 148; and further fulfill a ring-form space formed between the sleeves 157 and 163 and are withdrawn through the nozzle 164. On the other hand, the gas passes through the beds so as to cross them radially from the central part of the gas chamber 142 as shown by arrow marks in the lateral direction, and the dust, etc. contained in the gas is caught by the bed granules.

As the granules of the first stage bed 145 and the second stage bed 146, spheres of calcined alumina, etc. having a diameter of 1 to 2 mm may be preferably employed, and the granules of the first stage bed 172 (indicated by X marks) and those of the second stage bed 174 (indicated by O marks) may have either the same specification or different ones. The same specification may be convenient in the point of regeneration of granules after withdrawal from the vessel. In order to elevate the efficiency of dust removal in the second stage bed 146, for example the diameter of the granules 174 may be made somewhat smaller.

According to the above-mentioned granular bed filter, wherein a plurality of stages of granular beds are formed inside the pressure vessel, it is possible to elevate the efficiency of dust removal and at the same time make the apparatus smaller or compact. Further, since the inside structures are constructed in a suspended manner and also the thermal sleeves are employed, the thermal expansion of the apparatus can be absorbed easily, and the thermal deformation of the apparatus as well as the short-circuit of the gas can be prevented.

Coal gas to be introduced into the granular bed filter 60 has a temperature of 400° to 500° C. and a pressure of 20 to 30 kg/cm$^2$ G, and if the regeneration furnace 22 connected to this granular bed filter 60 is also under such a high pressure, the amount of combustion air i.e. fluidization air increases proportionally by an amount corresponding to the pressure. As a result, the amount of auxiliary fuel also increases. Further, the combustion exhaust gas will be also under pressure, resulting in the necessity of recovering power by e.g. an expansion turbine, which makes the apparatus complicated. Thus, from the standpoint of the economy of the system, it is preferable to operate the regeneration furnace 22 under normal pressures.

Figure 8:
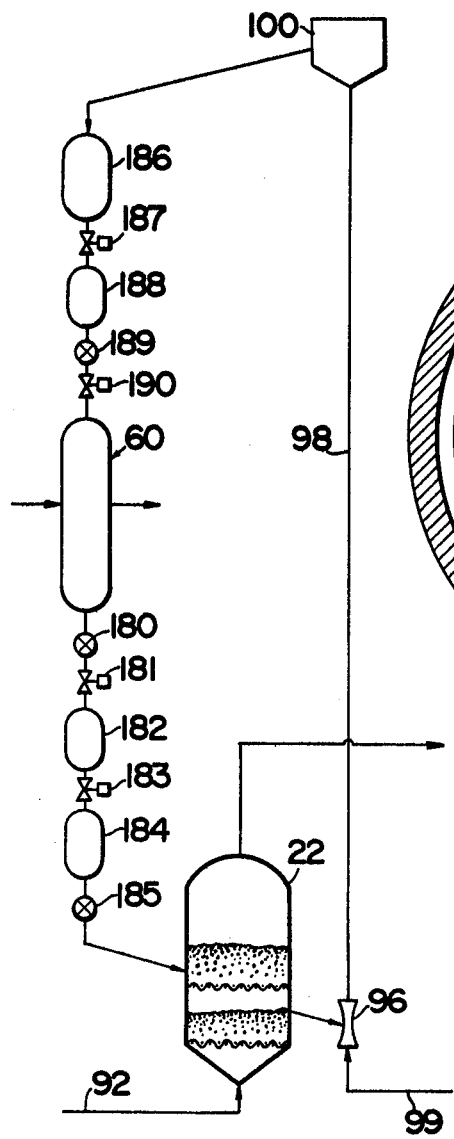
FIG. 8 shows a flow sheet including a combination of apparatuses for regenerating the medium granules contained in the granular bed filter, in an atmosphere of normal pressures and recirculating the regenerated granules to the granular bed filter.

FIG. 8 shows a systematic view of an apparatus for operating the regeneration furnace 22 connected to the granular bed filter 60 under normal pressures. On the pipeline connecting the granular bed filter 60 to the regeneration furnace 22 are successively provided a rotary valve 180, a lock valve 181, a lock hopper 182, a lock valve 183, a hopper 184 and a rotary valve 185. Further, on the pipeline for recirculating the granules regenerated in the regeneration furnace 22 to the granular bed filter 60, are successively provided a granule-blowing-up means 96, a primary hopper 100, a secondary hopper 186, a lock valve 187, a lock hopper 188, a rotary valve 189, and a lock valve 190.

In order to operate the regeneration furnace 22 as a fluidized bed combustion furnace under normal pressures (approximately the atmospheric pressure), the pressure of the granule atmosphere is reduced stepwisely down to a normal pressure through the hoppers 182 and 184 and the lock valves 181 and 183. Namely, the lock valve 183 is first closed and the rotary valve 180 and the lock valve 181 are opened to feed a definite amount of the granules into the lock hopper 182 under a lower pressure, followed by closing the lock valve 181. The lock valve 183 is then opened and the granules are received in the hopper 184 under a further lower pressure, followed by closing the lock valve 183. Further, the rotary valve 185 is opened to introduce the granules into the regeneration furnace 22 under a normal pressure.

Next, the medium granules are cooled down to a temperature approximate to the operation temperature of the granular bed in the regeneration furnace 22 and then sent by means of compressed air 99 through the blowing-up means 96 and the pipeline 98 to the upper hopper 100. Then, the hopper 186, lock valve 187, lock hopper 188, rotary valve 189 and lock valve 190 are successively opened or closed to elevate the pressure of the atmosphere of the granules, followed by feeding the granules to the granular bed filter 60. By operating the regeneration furnace under normal pressures, a small amount of the air 92 fed to the regeneration furnace may be sufficient.

FIG. 9 shows a preferred embodiment of the regeneration furnace 22. This furnace consists of two stage fluidized beds of an upper stage fluidized bed 91A and a lower stage fluidized bed 91B connected to the bed 91A through an overflow pipe 198. Tar, etc. adhering to the granules are burnt in the upper stage fluidized bed 91A, and air to be used for combustion in the upper stage fluidized bed 91A is preheated in the lower stage fluidized bed 91B and at the same time the regenerated granules are cooled therein. The granules in a hopper 184 are fed through a rotary valve 185 and a feed pipe 193 to the upper stage fluidized bed 91A. Air preheated in the lower stage fluidized bed 91B is sent through a perforated plate 194 into the upper fluidized bed 91A, wherein tar, etc. adhering to the granules are burnt to regenerate the granules. If the amount of heat is insufficient, an auxiliary fuel 128 is fed, while if it is in excess, the excess amount of heat can be recovered by means of a heat transfer coil 93 provided in the fluidized bed 91A. The resulting combustion waste gas is subjected to cooling and heat recovery by means of a waste heat recovery coil 95 provided inside an empty column part 195; sent through a duct 97 to a dust-collector 196 where dust is finally caught; and exhausted through a pipeline 197 as a clean gas. The granules subjected to combustion treatment in the upper fluidized bed 91A descend through the overflow pipe 198 provided inside the upper stage fluidized bed, to the lower stage fluidized bed 91B where the granules are cooled by contacting directly with the combustion air 92, and on the other hand, the combustion air is heated. The cooled granules are transported through the duct 94 to the top of the granular bed by means of the blowing-up means 96. The temperature of the medium of granules leaving the fluidized bed 91B is preferably made similar to that of the granular bed to maintain heat balance between them, which is easily designed by selecting the height of the lower stage fluidized bed and the superficial velocity in the column.

According to the above-mentioned embodiment, it is possible to regenerate the granules contained in the granular bed filter 60 under normal pressures; hence it is possible to reduce the respective amounts of combustion air and auxiliary fuel down to smaller ones than those under high pressures, and also simplify the structure of the apparatus.

FIG. 10 illustrates an embodiment of the gas cooler 62 and the scrubber 64 in the flow diagram shown in FIG. 5.

In FIG. 10, gas coolers 62A and 62B each have a plurality of heat transfer tubes 200 vertically arranged in a vertical type vessel and the lower ends of these heat transfer tubes 200 are opened inside respective scrubbers 64A and 64B. Further the respective coolers 62A and 62B are connected to a drum 109 through risers 111A and 111B and downcomers 112A and 112B, and also function as a waste heat boiler. The drum 109 is provided with a water feed line 114 and a steam discharge line 115. If only one cooler of large capacity is employed, gas distribution to the heat transfer tubes 200 becomes uneven and hence the descending condition of steam inside the heat transfer tubes 200 is unbalanced. For this reason, and for making its open sweeping easier, a plurality of coolers of small capacity are employed. Although two coolers 62A and 62B are shown in the figure, in the case of an amount to be treated, of 1000 t/day, e.g. 6 coolers may be employed. On the other hand, the respective scrubbers 64A and 64B provided just below the coolers 62A and 62B have therein a nozzle 201 for spraying recovered tar sent through a line 127, and by spraying recovered tar through the nozzle 201 and contacting the recovered tar directly with the gas, gas cooling and recovery of tar mist are at the same time effected.

Coal gas cooled in advance down to 400° to 500° C. is passed through a line 88, then branched, passed through lines 88A and 88B and introduced into gas coolers 62A and 62B. In the respective gas coolers, in order to prevent adhesion and solidification of tar onto the wall of the heat transfer tubes 200 and also to prevent uneven heat transfer of the tubes, the wall temperature of the heat transfer tubes is maintained at about 200° C. or higher. Thus, there may be selected such a saturation temperature of the discharge steam, e.g. 15 kg/cm² G in terms of the steam pressure on the line 115 from the drum 109, that the gas temperature after cooling (the exit temperature of the heat transfer tubes 200) and the wall temperature of the heat transfer tubes 200 can be maintained e.g. at 250° C. and 200° C. or higher, respectively. Accordingly, the temperature inside the tubes is not reduced to 200° C. or lower, and the total surface of the heat transfer tubes is maintained at a uniform temperature. The exit gas of the heat transfer tubes contains tar mist, which is removed by contacting it with recovered tar having a temperature of about 150° C. in the scrubbers 64A and 64B directly following the heat transfer tubes. The above-mentioned temperature (150° C.) of recovered tar sprayed inside the scrubbers has been selected taking into consideration the fluidity and pumping of the tar inside the tubes. If the fluidity of tar is not hindered, temperatures lower than 150° C. may be employed. Thus, the tar and gas inside the scrubbers 64A and 64B are cooled down to about 200° C.; in the state of a gas-liquid mixed phase, passed through ducts 108A and 108B connected to the lower end nozzles 202A and 202B; and introduced into a gas-liquid separator 116 where they are separated from each other. This separator 116 is preferred to be of a cyclone type. It is possible to simplify the apparatus by providing one separator per two coolers as shown in the figure. Purified gas obtained by separating tar mist is exhausted through a duct 118 to the outside of the system. On the other hand, recovered tar is collected through a piping 120 into a pot 122 and transported through a duct 124 and a pump 125 to a low pressure boiler 126. Excess tar is discharged through a duct 128 to the outside of the system and most part of the remainder is cooled down to e.g. 150° C. in the low pressure boiler 126 and then delivered through a duct 127 to a scrubber nozzle 201. As to the low pressure boiler 126, it is necessary to maintain the wall temperature of the heat transfer tubes at a temperature of 150° C. or higher at which the tar fluidity is kept, as in the case of the coolers; hence it is preferable to make the pressure inside the tubes a saturated vapor pressure corresponding to the above temperature. As a concrete example, the boiler 126 is so designed as to give 3 kg/cm² G as the pressure of generated steam 204 (saturation temperature: about 140° C.) and 150° C. or higher as the tar temperature inside the heat transfer tubes in the boiler 126, while the temperature of feed water 203 is normal.

According to the above-mentioned embodiment when the gas containing mist of adherent substances such as tar is cooled, it is possible to prevent adhesion and solidification of these adherent substances and effect waste heat recovery such as heat-exchange type recovery through steam formation; hence the thermal economy of plant is improved. Further, by employing recovered tar for the scruffers, cooling, dust removal and tar removal become easier without introducing any cooling medium from the outside of the system; hence it is possible to effectively utilize the tar which causes obstacles to the utilities of plant.

What is claimed is:

1. A process for the recovery of heat in coal gasification which comprises:
   (a) generating gas in a coal gasification furnace;
   (b) introducing the gas into a granular bed means provided with heat transfer tubes having cooling medium passing therethrough thereby cooling the gas;
   (c) recovering the heat of the gas in the granular bed means as heated cooling medium;
   (d) passing the gas cooled in (b) successively through a gas cooler and a scrubber, to cool the gas and remove dust and tar mist therefrom; and
   recovering the heat of the gas cooled in step (d), wherein said granular bed means includes a fluidized bed cooler, in which said heat transfer tubes are located, and a granular moving bed filter, said gas being introduced into the fluidized bed cooler and unnecessary substances including tars which are in the gas are adhered to the granules in the fluidized bed cooler and then the gas is introduced into the granular bed filter where dust in the gas is removed by adherence to the granules in the filter, and wherein the cooling medium is water, the heat of the generated gas is recovered in the form of high pressure steam through the heat transfer tubes in the granular bed means, the heat in the gas cooler and the scrubber is recovered in the forms of medium pressure steam and of low pressure steam respectively.

2. A heat recovery process according to claim 1 wherein said granular bed filter comprises a body consisting of a vertical type vessel; a gas-introducing passage provided at the axially central part of said body; a plurality of louver-form walls provided so as to concentrically surround said gas-introducing passage with ring-form spaces; a means for forming moving beds by feeding granules into the respective ring-form spaces between these louver-form walls; and nozzles for discharging the gas having passed through said louver-form walls and said moving beds of granules to the outside of said body, the respective upper ends of said louver-form walls being fixed onto said body through a granule-feeding duct, the respective lower ends of said walls being connected to a granule-discharging duct, and the respective granule-discharging ducts being slidably contacted with the opening part of said body at the lower end part thereof so as to enable these granule-discharging ducts to effect easy thermal expansion.

3. A process according to claim 1 wherein granules having unnecessary substances adhered thereto and granules having dust adhered thereto are withdrawn from the fluidized bed cooler and the granular bed filter, respectively, are regenerated in a fluidized bed combustion furnace by subjecting the granules to a combustion treatment therein and are recirculated to the fluidized bed cooler and to the granular bed filter.

4. A heat recovery process according to claim 3 wherein said fluidized bed-combustion furnace is provided with an upper stage fluidized bed and a lower stage fluidized bed, said lower stage fluidized bed being connected to said upper stage bed through an overflow pipe; in said upper stage fluidized bed, unnecessary substances adhering to the granules are burnt; and in said lower stage fluidized bed, air to be fed to said upper stage fluidized bed is preheated and at the same time the regenerated granules flowing down through said overflow pipe are cooled.

5. A heat recovery process according to claim 3 wherein the regeneration furnace is operated under normal pressure.

6. A heat recovery process according to claim 5 wherein the regeneration furnace is provided with a lock valve and a lock hopper in each of a granules feed pipe and a granules discharge duct, respectively, said lock valve and lock hopper operating alternately.

7. A heat recovery process according to claim 1 wherein said gas cooler consists of a vertical type vessel wherein a plurality of heat transfer tubes are vertically arranged and cooling water is passed through the vessel outside of said heat transfer tubes, the lower ends of these heat transfer tubes being opened inside the scrubber containing nozzles for spraying recovered tar, and the gas cooled by passing through said heat transfer tubes being introduced directly into said scrubber and contacted with recovered tar of lower temperature than the gas introduced into said scrubber.

8. A heat recovery process according to claim 7 wherein said gas cooler is connected to a condensation drum by a riser and a downcomer, and the heat of the gas passing through said heat transfer tubes is recovered in the form of medium pressure steam through said condensation drum.

9. A heat recovery process according to claim 7 wherein said scrubber is further connected to a gas-liquid separator to condense and recover tar from the gas from said gas cooler and is provided with a means for recirculating the recovered tar to said scrubber and also is provided with a heat-exchange means for recovering the heat of the recovered tar in the form of low pressure steam.

10. A process according to claim 2 wherein a plurality of ring-form concentric moving beds are provided in the granular bed filter, said moving beds being separated by ring-form gas chambers having louver-form walls.

11. A process according to claim 10 including passing the gas radially from the introducing passage through the concentric moving beds separated by gas chambers toward the outer periphery of the vessel thereby removing dust from the gas and discharging the dust-free gas through nozzle means in the outer periphery.

12. The process according to claim 2 wherein the moving bed thickness is 500–600 mm.

13. The process according to claim 4, wherein the upper stage bed is provided with a heat transfer coil thereby recovering the excess heat of combustion produced in the upper stage bed.

14. The process according to claim 7, wherein medium pressure steam having a saturated temperature corresponding to 200° to 250° C. is produced, wherein the temperature of the surface of the heat transfer tubes is maintained above 200° C. and further wherein the gas is cooled to a temperature of approximately 250° C.

15. The process according to claim 7 wherein the temperature of the recovered tar is approximately 150° C.

* * * * *